United States Patent [19]
Dotson

[11] 3,961,808
[45] June 8, 1976

[54] REAR FENDER ASSEMBLY FOR WHEEL LOADERS

[75] Inventor: Michael L. Dotson, Plano, Ill.

[73] Assignee: Caterpillar Tractor Co., Peoria, Ill.

[22] Filed: June 2, 1975

[21] Appl. No.: 583,225

[52] U.S. Cl. ..................... 280/153 R; 280/154.5 R
[51] Int. Cl.² ........................................ B62D 25/16
[58] Field of Search ............ 280/153 R, 152 R, 154, 280/154.5 R

[56] References Cited
UNITED STATES PATENTS

| | | | |
|---|---|---|---|
| 2,771,304 | 11/1956 | La Pere | 280/152 R |
| 3,198,545 | 8/1965 | McDaniel | 280/154.5 R |
| 3,876,229 | 4/1975 | Kohn | 280/152 R |
| 3,879,059 | 4/1975 | Gibes | 280/153 R |

*Primary Examiner*—Robert R. Song
*Attorney, Agent, or Firm*—Phillips, Moore, Weissenberger Lempio & Strabala

[57] ABSTRACT

A wheel loader comprises a frame having a rear fender assembly secured thereon to substantially cover a ground-engaging wheel. The fender assembly comprises a fender secured at its rearward end to a box-like support bracket which is, in turn, secured to a bumper assembly. A reinforcing and deflection member is secured within the support and is disposed in close proximity to the wheel to deflect any debris thrown thereagainst.

10 Claims, 4 Drawing Figures

REAR FENDER ASSEMBLY FOR WHEEL LOADERS

BACKGROUND OF THE INVENTION

Modern day construction vehicles, such as wheel loaders, normally comprise a fender assembly for each road wheel which provides substantial protection to the operator and vehicle components in the event that the wheel kicks up debris during a construction operation. In addition, the use of a track belt or the like on the wheel dictates the need for a rear fender assembly which exhibits a high degree of structural integrity for protective purposes. Such fender assemblies must also provide the vehicle operator with good visibility and should exhibit the capability of being readily serviceable.

SUMMARY OF THIS INVENTION

An object of this invention is to provide an improved rear fender assembly for a construction vehicle which exhibits a high degree of structural integrity, does not unduly impair an operator's vision and is adapted to be serviced expeditiously. The fender assembly comprises a fender mounted on the frame of the vehicle to overlie a respective wheel and a support bracket secured between the frame and a rearward end of the fender. A reinforcing and deflection member is secured to a forward end of the bracket and is disposed closely adjacent to the wheel to extend transversely thereacross to deflect any debris occasioned thereby. In the preferred embodiment of this invention, a rearward end of the bracket is secured to a bumper assembly mounted on the frame of the vehicle.

BRIEF DESCRIPTION OF THE DRAWINGS

Other objects of this invention will become apparent from the following description and accompanying drawings wherein.

DETAILED DESCRIPTION

Figure 1:
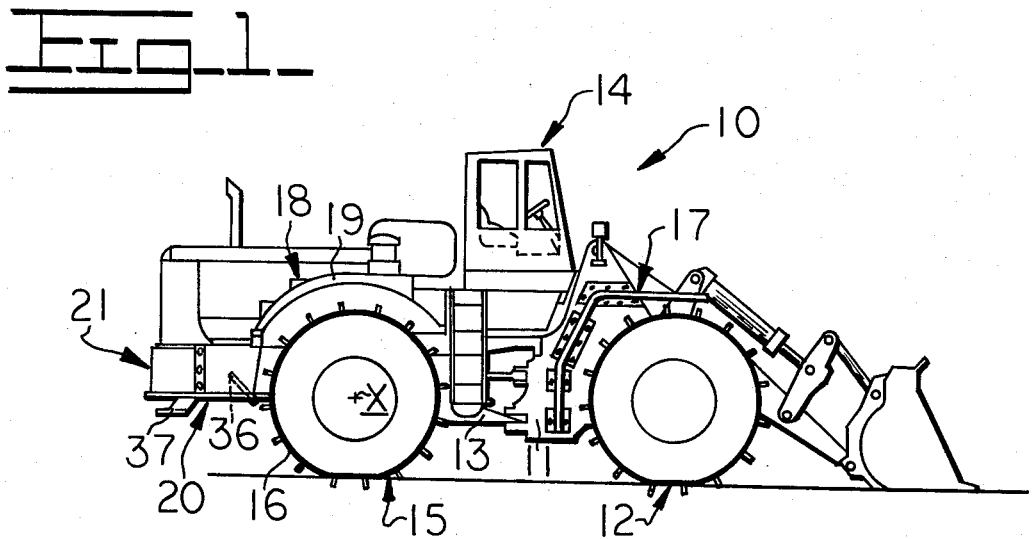
FIG. 1 is a side elevational view of a wheel loader having the fender assembly of this invention mounted thereon.

Referring to FIG. 1, an articulated wheel loader 10 comprises a front frame 11 having a pair of laterally spaced, ground-engaging road wheels 12 (one shown) rotatably mounted thereon. A rear frame 13 is articulated to the front frame and has an operator's cab 14 suitably mounted thereon to afford the operator with multi-directional visibility alongside and over the wheel loader. The rear frame is mounted on a pair of road wheels 15 (one shown) which may have a track belt 16 suitably entrained thereabout.

Such track belt, which may also be mounted on each of the front road wheels, may be of the type disclosed in U.S. Pat. No. 3,773,394. Each of the front road wheels is substantially covered by a fender assembly 17 which may be of the type disclosed in U.S. patent application Ser. No. 431,100, filed on Jan. 7, 1974 by Richard J. Gibbs for "Fender Construction for Wheel Loaders" and now U.S. Pat. No. 3,879,059. The above referenced patent and application are each assigned to the assignee of this application.

Figure 2:
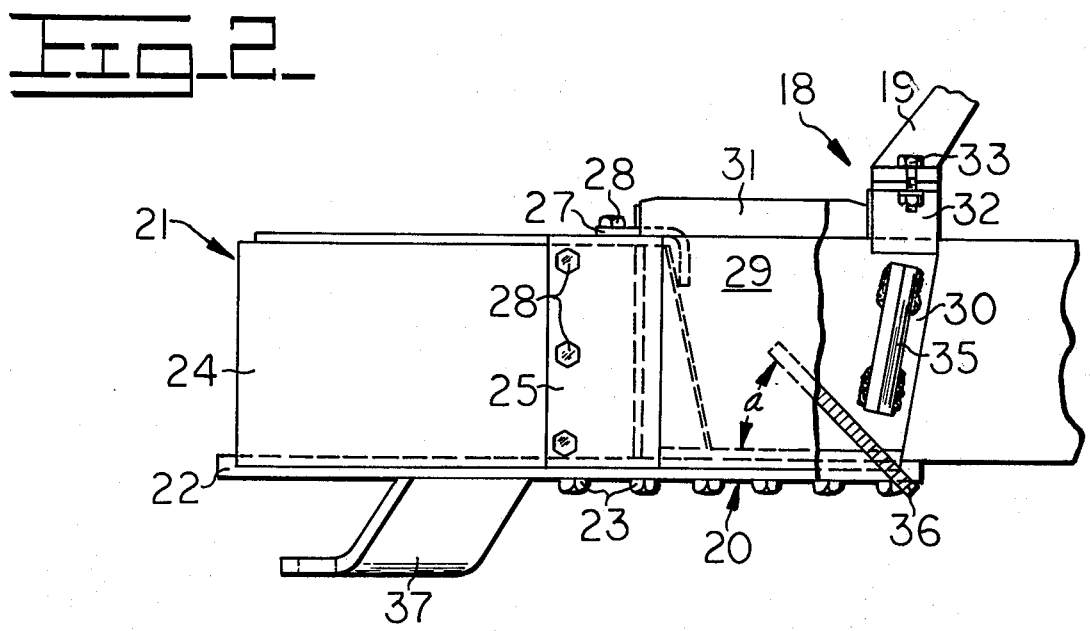
FIG. 2 is an enlarged side elevational view of a support bracket and attendant structures employed in the fender assembly.
Figure 3:
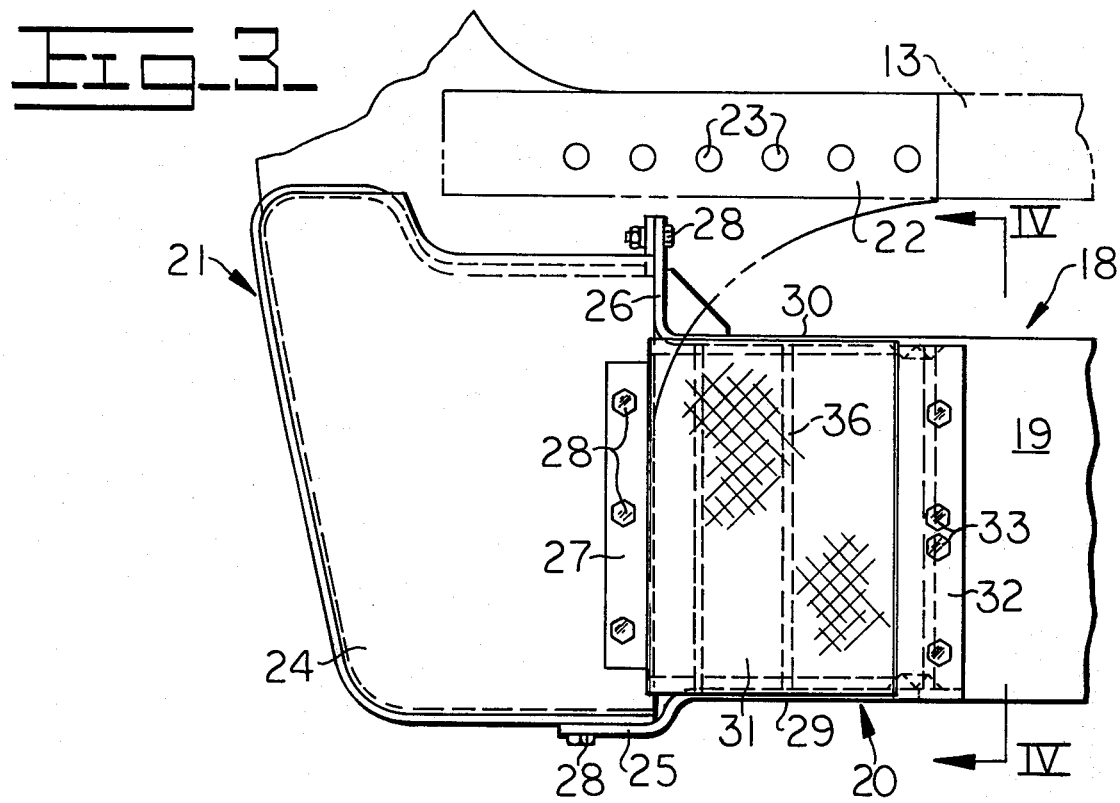
FIG. 3 is a top plan view of the structures illustrated in FIG. 2.
Figure 4:
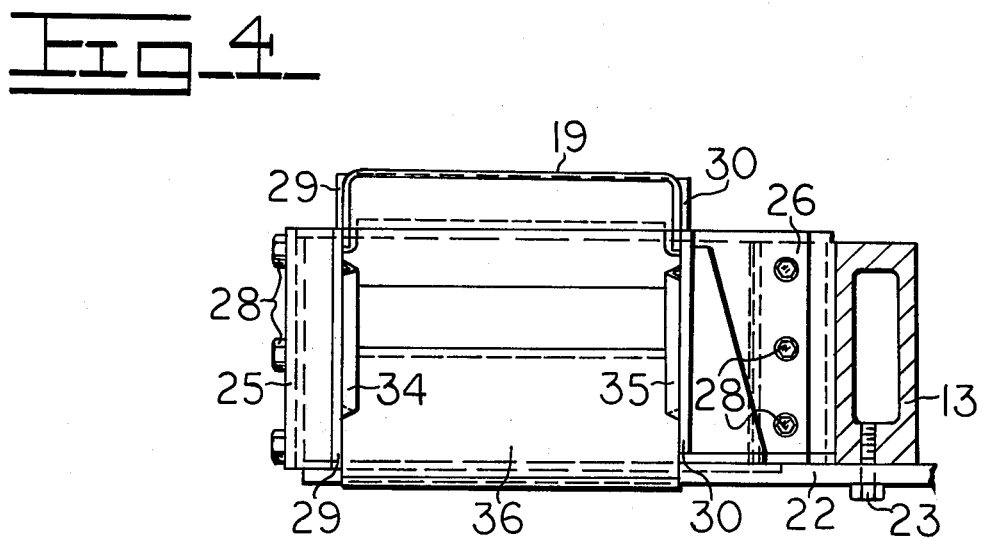
FIG. 4 is a sectional view taken in the direction of arrows IV—IV in FIG. 3.

This invention is particularly directed to a rear fender assembly 18 which substantially covers each rear road wheel 15. Each rear fender assembly comprises an arcuate fender 19 suitably secured to a side of the loader to substantially overlie wheel 15. Referring to FIGS. 2–4, a box-like support bracket 20 of the fender assembly is secured between the frame of the vehicle and a rearward end of fender 19. The rearward end of the bracket is preferably secured to a bumper assembly 21 which is, in turn, suitably secured to frame 13 of the vehicle.

In particular, the bumper assembly comprises a horizontally disposed plate 22 secured to frame 13 by a plurality of bolts 23. An end portion 24 of the bumper assembly is secured to flanges 25, 26 and 27 of bracket 20 by a plurality of cap screws 28. Flanges 25 and 26 are formed integrally with a pair of vertically disposed outboard and inboard side plates 29 and 30 of the bracket.

Flange 27 is secured to a horizontally disposed and serrated plate 31. The latter plate is secured transversely between side plates 29 and 30 of bracket 20 and has a flange 32 formed integrally on a forward end thereof and secured to fender 19 by cap screws 33. Plate 31 thus functions to increase the overall structural integrity of the fender assembly as well as providing a foot rest for a workman upon his assent on the vehicle for engine servicing purposes.

A pair of generally upright angle bars 34 and 35 (FIG. 2) are secured interiorly on side plates 29 and 30, respectively, in general vertical alignment below the attachment of fender 19 to flange 32 of plate 31. A combined reinforcing and deflection member of flat plate 36 is secured between the side plates at a forward end of bracket 20. As shown in FIG. 1, the forward end of plate 36 terminates closely adjacent to wheel 15 and extends transversely across the periphery thereof.

The plate extends rearwardly and upwardly away from the wheel at an acute angle $a$, relative to plate 22 and an imaginary horizontally disposed plane, which may approximate 45°.

The plate is preferably disposed vertically at least approximately in the same horizontal plane containing rotational axis X of wheel 15 to deflect debris or the like thrown thereagainst. Such debris will tend to be deflected downwardly and rearwardly of the vehicle due to the inclination of the plate. If so desired, a pull hitch 37 may be secured beneath plate 22 since the heavily reinforced bumper and fender assemblies will function to absorb any towing forces imposed thereon.

I claim:

1. In an earthworking vehicle comprising a frame having a pair of laterally spaced ground engaging wheels rotatably mounted on a rearward end thereof and a fender assembly mounted on said frame to cover each of said wheels, said fender assembly comprising a fender overlying a respective wheel, a support bracket secured to each of said frame and a rearward end of said fender and a reinforcing and deflection member secured to a forward end of said bracket and disposed closely adjacent to said wheel to extend transversely across the periphery thereof.

2. The vehicle of claim 1 wherein said member is disposed to extend rearwardly and upwardly from said wheel at an acute angle relative to an imaginary horizontally disposed plane.

3. The vehicle of claim 2 wherein said angle approximates 45°.

4. The vehicle of claim 1 further comprising a bumper assembly mounted on a rearward end of said frame and wherein said bracket is secured to said bumper assembly.

5. The vehicle of claim 4 wherein said bracket comprises a pair of vertically disposed and parallel side plates extending rearwardly to each terminate at a flange secured to said bumper assembly.

6. The vehicle of claim 5 wherein said bracket further comprises an upper horizontally disposed plate secured to said side plates and extending rearwardly to terminate at a flange secured to said bumper assembly.

7. The vehicle of claim 6 further comprising an angle bar secured interiorly on each of said side plates in general vertical alignment below the rearward end of said fender.

8. The vehicle of claim 1 wherein said member constitutes a flat plate at least approximately disposed vertically in the same horizontal plane containing a rotational axis of said wheel.

9. The vehicle of claim 4 further comprising a pull hitch secured beneath said bumper assembly.

10. The vehicle of claim 1 further comprising a track belt entrained circumferentially about each of said wheels.

* * * * *